(12) United States Patent
Andreoli et al.

(10) Patent No.: US 9,606,988 B2
(45) Date of Patent: Mar. 28, 2017

(54) PREDICTING THE QUALITY OF AUTOMATIC TRANSLATION OF AN ENTIRE DOCUMENT

(71) Applicant: Xerox Corporation, Norwalk, CT (US)

(72) Inventors: Jean-Marc Andreoli, Meylan (FR); Diane Larlus-Larrondo, La Tronche (FR); Jean-Luc Meunier, Saint-Nazaire-les-Eymes (FR)

(73) Assignee: XEROX CORPORATION, Norwalk, CT (US)

( * ) Notice: Subject to any disclaimer, the term of this patent is extended or adjusted under 35 U.S.C. 154(b) by 210 days.

(21) Appl. No.: 14/532,238

(22) Filed: Nov. 4, 2014

(65) Prior Publication Data

US 2016/0124944 A1 May 5, 2016

(51) Int. Cl.
*G06F 17/28* (2006.01)

(52) U.S. Cl.
CPC ................... *G06F 17/2854* (2013.01)

(58) Field of Classification Search
None
See application file for complete search history.

(56) References Cited

U.S. PATENT DOCUMENTS

| | | | |
|---|---|---|---|
| 6,182,026 B1 | 1/2001 | Tillmann et al. | |
| 6,917,936 B2 | 7/2005 | Cancedda | |
| 8,108,202 B2* | 1/2012 | Kwon | G06F 17/211 704/2 |
| 8,543,563 B1 | 9/2013 | Nikoulina et al. | |
| 9,026,425 B2* | 5/2015 | Nikoulina | G06F 17/2818 704/1 |
| 9,213,694 B2* | 12/2015 | Hieber | G06F 17/2854 |
| 2004/0024581 A1 | 2/2004 | Koehn et al. | |
| 2004/0030551 A1 | 2/2004 | Marcu et al. | |
| 2005/0137854 A1 | 6/2005 | Cancedda et al. | |
| 2006/0190241 A1 | 8/2006 | Goutte et al. | |
| 2007/0150257 A1 | 6/2007 | Cancedda et al. | |
| 2007/0265825 A1* | 11/2007 | Cancedda | G06F 17/2818 704/2 |
| 2008/0069456 A1 | 3/2008 | Perronnin | |
| 2008/0262826 A1 | 10/2008 | Pacull | |
| 2008/0300857 A1 | 12/2008 | Barbaiani et al. | |
| 2009/0175545 A1 | 7/2009 | Cancedda et al. | |

(Continued)

OTHER PUBLICATIONS

U.S. Appl. No. 14/244,385, filed Apr. 3, 2014, Meunier.

(Continued)

*Primary Examiner* — Satwant Singh
(74) *Attorney, Agent, or Firm* — Fay Sharpe LLP (57) ABSTRACT

A system and method predict the translation quality of a translated input document. The method includes receiving an input document pair composed of a plurality of sentence pairs, each sentence pair including a source sentence in a source language and a machine translation of the source language sentence to a target language sentence. For each of the sentence pairs, a representation of the sentence pair is generated, based on a set of features extracted for the sentence pair. Using a generative model, a representation of the input document pair is generated, based on the sentence pair representations. A translation quality of the translated input document is computed, based on the representation of the input document pair.

21 Claims, 3 Drawing Sheets

(56) References Cited

U.S. PATENT DOCUMENTS

| | | |
|---|---|---|
| 2010/0268527 A1 | 10/2010 | Tomeh et al. |
| 2011/0022380 A1 | 1/2011 | Zaslavskiy et al. |
| 2011/0178791 A1 | 7/2011 | Stymne et al. |
| 2011/0225104 A1* | 9/2011 | Soricut ............... G06F 17/289 705/348 |
| 2011/0282643 A1 | 11/2011 | Chatterjee et al. |
| 2011/0288852 A1 | 11/2011 | Dymetman et al. |
| 2011/0307245 A1 | 12/2011 | Hanneman et al. |
| 2012/0041753 A1 | 2/2012 | Dymetman |
| 2012/0101804 A1 | 4/2012 | Roth et al. |
| 2012/0253783 A1* | 10/2012 | Castelli ............... G06F 17/2854 704/3 |
| 2012/0259807 A1 | 10/2012 | Dymetman |
| 2012/0303352 A1* | 11/2012 | Coen ................... G06F 17/2854 704/2 |
| 2013/0006954 A1 | 1/2013 | Nikoulina et al. |
| 2013/0064444 A1 | 3/2013 | Gordo et al. |
| 2013/0204885 A1 | 8/2013 | Clinchant et al. |
| 2014/0067361 A1 | 3/2014 | Nikoulina et al. |
| 2014/0200878 A1 | 7/2014 | Mylonakis |
| 2014/0207439 A1 | 7/2014 | Venkatapathy et al. |
| 2015/0286632 A1* | 10/2015 | Meunier ............. G06F 17/2854 704/2 |
| 2016/0162478 A1* | 6/2016 | Blassin ............ G06Q 10/06311 706/12 |

OTHER PUBLICATIONS

Almaghout, et al., "A CCG-based Quality Estimation Metric for Statistical Machine Translation," Machine Translation Summit XIV, pp. 223-230 (2013).

Beck, et al., "SHEF-Lite: When Less is More for Translation Quality Estimation," In Eighth Workshop on Statistical Machine Translation (WMT-2013) pp. 337-342 (2013).

Beck, et al., "Reducing Annotation Effort for Quality Estimation via Active Learning," In 51st Annual Meeting of the Association for Computational Linguistics: Short Papers, pp. 543-548 ACL (2013).

Blatz, et al., "Confidence Estimation for Machine Translation," Proc. 20th Intern'l Conf. on Computational Linguistics Article No. 315, pp. 1-112 (2004).

Bojar, et al., "Findings of the 2013 workshop on statistical machine translation," Proc. 8$^{th}$ Workshop on Statistical Machine Translation, pp. 1-44 (2013).

Callison-Burch, et al., "(Meta-) evaluation of machine translation," Proc. 2nd Workshop on Statistical Machine Translation, pp. 136-158, ACL (2007).

Callison-Burch, et al., "Findings of the 2012 workshop on statistical machine translation," Proc. Seventh Workshop on Statistical Machine Translation, Association for Computational Linguistics, Montreal, Canada, pp. 10-51 (2012).

Cohn, et al., "Modelling annotator bias with multi-task Gaussian processes: An application to machine translation quality estimation," Proc. 51st Annual Meeting of the ACL, pp. 32-42 (2013).

Dempster, et al., "Maximum Likelihood From Incomplete Data Via the EM Algorithm," Journal of the Royal Statistical Society, vol. 39, No. 1, pp. 1-38 (1977).

Jaakkola, et al., "Exploiting generative models in discriminative classifiers," Advances in neural information processing systems, pp. 487-493 (1999).

Perronnin, et al., "Fisher kernels on visual vocabularies for image categorization," IEEE Conference on Computer Vision and Pattern Recognition ( CVPR'07), pp. 1-8 (2007).

Perronnin, et al., "Improving the Fisher kernel for large-scale image classification," ECCV pp. 1-14 (2010).

Sanchez, et al., "Image Classification with the Fisher Vector: Theory and Practice," INRIA Research Report No. 8209, pp. 1-42 (May 2013).

Soricut et al., "TrustRank: Inducing Trust in Automatic Translations via Ranking," Proceedings of the 48th Annual Meeting of the Association for Computational Linguistics, pp. 612-621 (Jul. 2010).

Soricut et al., "Combining Quality Prediction and System Selection for Improved Automatic Translation Output," Proceedings of the 7$^{th}$ Workshop on Statistical Machine Translation, pp. 163-170 (Jun. 2012).

Specia et al., "Deliverable D2.1.2 Quality Estimation Software Extensions," pp. 1-31 (Oct. 2013) downloaded at http://www.qt21.eu/launchpad/system/files/deliverables/qtlp-deliverable-d2.1.2.pdf.

Specia et al., "Improving the Confidence of Machine Translation Quality Estimates," Proc. MT Summit XII, pp. 1-8 (2009).

Specia et al., "Estimating the Sentence-Level Quality of Machine Translation," 13th Annual Conf. of the European Association for Machine Translation (EAMT), pp. 28-35 (2009).

Tillman et al., "A Phrase-Based Unigram Model for Statistical Machine Translation," Proc. HLT-NAACL 2003 Conference, pp. 1-3 (2003).

Wikipedia "Mixture Model," downloaded on Aug. 1, 2014, at http://en.wikipedia.org/wiki/Mixture_model.

Zens et al., "Improvements in Phrase-Based Statistical Machine Translation," Proc. Conference HLT-NAACL pp. 1-8 (2004).

\* cited by examiner

PREDICTING THE QUALITY OF AUTOMATIC TRANSLATION OF AN ENTIRE DOCUMENT

BACKGROUND

The exemplary embodiment relates to machine translation and finds particular application in connection with a system and method for predicting the quality of automatic translation of a whole document.

Automated translation, also called machine translation (MT), is concerned with the automatic translating a textual document from a source language to a target language. Statistical Machine Translation (SMT) is a common approach. In a phrase-based method the translation entails, for each source sentence, drawing biphrases (source-target phrase pairs) from a biphrase library to cover the sentence. The candidate translation is then scored with a scoring function which takes into account probabilities of occurrence, in a parallel corpus, of the biphrases which were used. Other SMT systems are based on the translation of syntactic units, using partial parse trees. Although the quality of SMT is usually lower than what a professional human translator can achieve, it is valuable in many business applications.

To cope with translation errors in automated translation, translation quality estimation methods have been developed to predict the quality of the translation independently of the translation process itself. Such methods include Confidence Estimation (CE) and Quality Prediction (QP). See, for example, Blatz, et al., "Confidence Estimation for Machine Translation," Proc. 20th Intern'l Conf. on Computational Linguistics Article No. 315 (2004), hereinafter, "Blatz 2004"; Specia, et al., "Estimating the sentence-level quality of machine translation," 13th Annual Conf. of the European Association for Machine Translation (EAMT), pp. 28-37 (2009), hereinafter, "Specia 2009." While the quality and confidence approaches differ slightly from each other, from a practical applicative perspective, their computation and usage is generally the same.

The quality estimation is often cast as a multi-class classification problem or as a regression problem. First, a training set is generated by human evaluation of the quality of translation of a textual dataset at the sentence level. Then a classifier (or regressor) is learnt in order to predict a score for a new translation. Often, a coarse grained scale is used for labeling the training data, since the evaluation of the quality of a translation is highly subjective, as evidenced by the low level of agreement among multiple human evaluators. In some cases, the labels can be integers from 1-4, with 4 indicating the highest quality and 1, the lowest. Often, a binary classifier suffices because in a typical business context, the goal is simply to decide whether to trust the machine translation or not. In some approaches, two dimensions are evaluated separately, such as fluency (of the output text) and adequacy (of its content with respect to the input text). If the score is below a threshold quality (or 0 in the binary case), a manual translation of the input text is obtained, generally from a person who is fluent in the two languages.

QP is often used by professional translators, who combine the use of a translation memory and machine translation to perform their translation tasks. When the quality of machine translation is good, post-editing is faster than editing the target sentence from scratch. However, in other applications, it may not be feasible for the output of machine translation to be post-edited, for example, because the user does not speak the target language. In such a situation, the goal is to decide whether to trust the machine translation, or whether to use a speaker of the language to process the input source text language. In such cases, a binary classifier can suffice.

Machine translation quality predictors are sometimes built on a statistical model operating on a feature set obtained from both the input and output texts (black box features) as well as from information from the inner functioning of the SMT system (glass box features). See, for example, Specia, et al., "Improving the Confidence of Machine Translation Quality Estimates," Proc. MT Summit XII (2009).

One problem with existing quality predictors is that an SMT system works at the sentence-level, so quality estimation is performed on each sentence independently. It is therefore difficult to estimate the quality of an entire document, which may be composed of a number of sentences. Often, it is a document-level quality estimate which is needed.

U.S. application Ser. No. 14/244,385, filed Apr. 3, 2014, describes an approach for computing message translation quality. The method employs annotation both at the sentence level and at the document level, and relies on the availability of a relatively large set of annotated documents in the same domain.

There remains a need for a system and method which are able to estimate the quality of translation of a document composed of a series of sentences that were translated individually, without the need for training set that is annotated at both sentence-level and message-level.

INCORPORATION BY REFERENCE

The following references, the disclosures of which are incorporated herein in their entireties by reference, are mentioned:

U.S. application Ser. No. 14/244,385, filed Apr. 3, 2014, entitled PREDICTING THE QUALITY OF AUTOMATIC TRANSLATION OF AN ENTIRE DOCUMENT, by Jean-Luc Meunier describes a method for predicting the translation quality of a document. A translation quality estimate is received for each of a plurality of sentences of an input document which have been translated from a source language to a target language using machine translation. The translation quality of the translated input document is predicted, based on the translation quality estimate for each of the sentences and parameters of a model learned using translation quality estimates for sentences of training documents and respective manually-applied translation quality values.

U.S. Pub. No. 20130204885, published Aug. 8, 2013, entitled DOCUMENT PROCESSING EMPLOYING PROBABILISTIC TOPIC MODELING OF DOCUMENTS REPRESENTED AS TEXT WORDS TRANSFORMED TO A CONTINUOUS SPACE, by Stephane Clinchant, et al., describes a method in which a set of word embedding transforms are applied to transform text words of a set of documents into K-dimensional word vectors in order to generate sets or sequences of word vectors representing the documents of the set of documents. A probabilistic topic model is learned using the sets or sequences of word vectors representing the documents of the set of documents. The set of word embedding transforms are applied to transform text words of an input document into K-dimensional word vectors in order to generate a set or sequence of word vectors representing the input document. The learned probabilistic topic model is applied to assign probabilities for topics of the probabilistic topic model to the set or sequence of word vectors representing the input document.

BRIEF DESCRIPTION

In accordance with one aspect of the exemplary embodiment, a method for predicting the translation quality of a translated input document includes receiving an input document pair composed of a plurality of sentence pairs. Each sentence pair includes a source sentence in a source language and a machine translation of the source language sentence to a target language sentence. For each of the sentence pairs, the method includes generating a representation of the sentence pair based on a set of features extracted for the sentence pair. A representation of the input document pair is generated, based on the sentence pair representations. A translation quality of the translated input document is predicted, based on the representation of the input document pair.

At least one of the generating of the representation of the sentence pair, the generating of the representation of the input document pair, and the predicting of the translation quality of the translated input document may be performed with a processor.

In accordance with another aspect of the exemplary embodiment, a system for predicting the translation quality of a translated input document is provided. The system includes memory which stores a machine translation component for translating sentences of an input document from a source language to a target language to provide a translated input document comprising a plurality of sentence pairs, a feature extraction component which generates a representation of each of the sentence pairs, based on a set of features extracted for the sentence pair, a document-level representation component which generates a fixed-length representation of the input document based on the sentence pair representations, and a prediction component for predicting a translation quality of the translated input document based on the representation of the input document. A processor implements the machine translation component, feature extraction component, document level representation component and prediction component.

In accordance with another aspect of the exemplary embodiment, a method for generating a system for predicting the translation quality of a document includes receiving a set of training document pairs. Each training document pair includes a plurality of training sentence pairs. Each of the training sentence pairs includes a source sentence in a source language and a target sentence in a target language. The target sentence is a machine translation of the respective source sentence. At least some of the training document pairs are annotated with a translation quality estimate. A feature extraction component is provided which generates a representation of each of the training sentence pairs, based on a set of features extracted for the sentence pair. The method further includes generating a generative model, based on the representations of the training sentence pairs. The generative model is configured for generating a fixed-length document-level representation for a new document pair based on representations of a plurality of sentence pairs of the new document pair. A prediction component is trained to predict a translation quality of the new document pair. The training is based on the translation quality estimates and document-level representations of the training sentence pairs generated with the generative model.

At least one of the generating and training may be performed with a processor.

DETAILED DESCRIPTION

Aspects of the exemplary embodiment relate to a system and method for predicting the overall translation quality of a translated document composed of a sequence of sentence translations. In particular, parameters of a classifier model are learned for use in predicting the translation quality of a document of variable length (in terms of number of sentences) using a set of training documents which have been human annotated at the document level with translation quality estimates. The exemplary method avoids the need for human annotation of the training documents at the sentence level.

One problem with message-level estimation of translation quality is that messages are of different length, in terms of the number of sentences that they contain. The exemplary method addresses this by computing a message-level representation for each translated message, using a set of translation features extracted for each of the sentences.

The exemplary document-level representation is a weighted mixture of components, such as Gaussian functions and can be for example, a Fisher Vector, such as a Fisher Kernel.

The method finds use in a variety of applications. As an example, a customer care agent for a business communicates, e.g., via a web browser or email, with a customer who speaks a different language. The customer care agent wishes to have his responses translated quickly into the customer's language, but would like the message translations to be of good quality as a whole, so that they are not confusing to the customer or present a poor image of the business. Additionally, the agent would like the customer's messages to be translated to the agent's own language. The exemplary system and method can be used for analysis of the translated messages sent in both directions, optionally with different thresholds on the message-level translation quality. The method is useful when no reference (human) translation is yet available, as is the case in the exchange of messages between a customer and an agent. The exemplary method utilizes a training set of document level quality annotations, which can be kept up-to-date by allowing the agent and/or the customer to validate or modify, on the fly or in a later session, the quality estimates produced.

Figure 1:
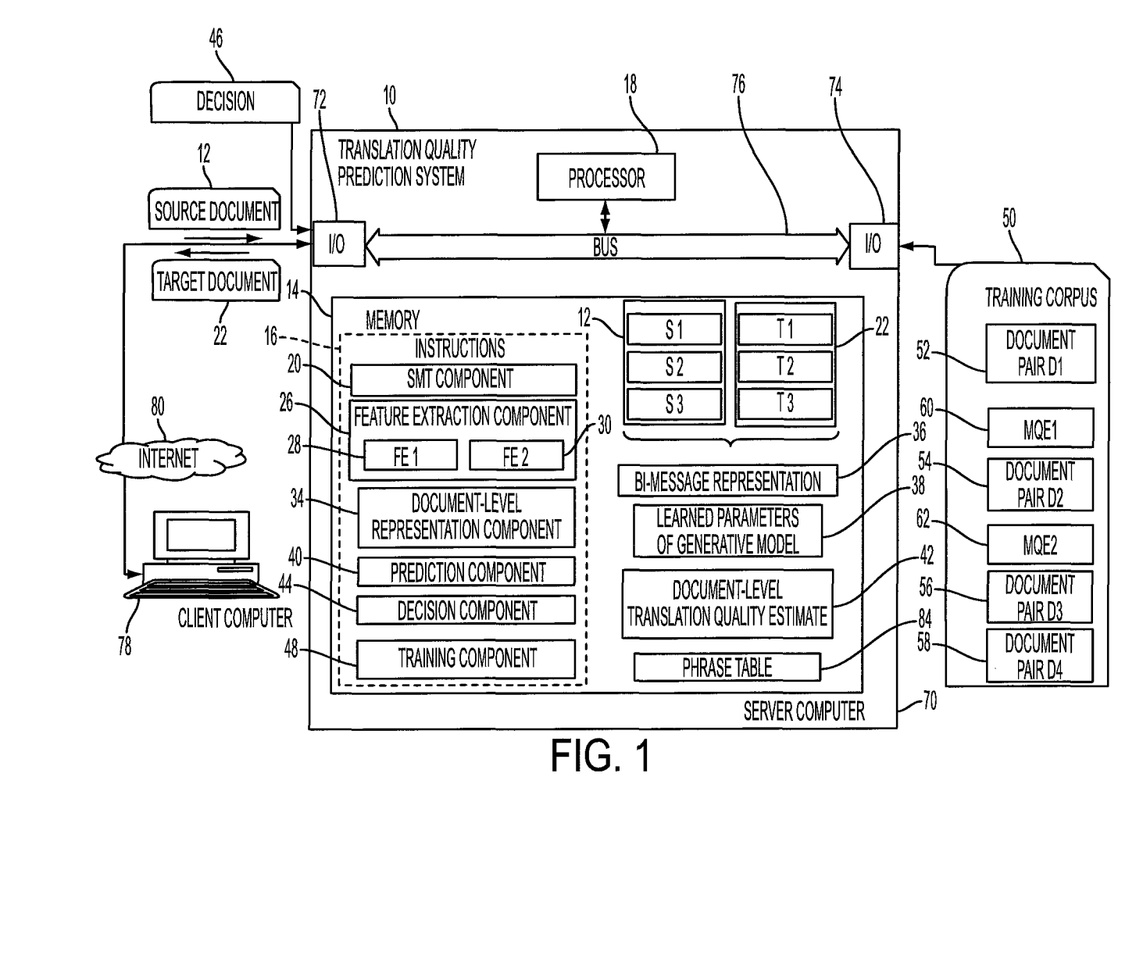
FIG. 1 is a functional block diagram of a quality estimation system in accordance with one aspect of the exemplary embodiment.

With reference to FIG. 1, a system 10 for evaluating the quality of a machine translation of an input source language document 12, such as a message is shown. The system includes memory 14 which includes instructions 16 for performing the exemplary methods described herein with reference to FIGS. 2 and 3 and a processor 18 in communication with the memory 14 for executing the instructions. The system memory 14 includes or has access to a statistical machine translation (SMT) component 20, which translates text from the source natural language to a target natural language, different from the source language. The SMT system operates at the sentence level, i.e., generates a translation for each sentence of the document 12 independently. As will be appreciated, more than one SMT component 20 may be provided, allowing the system to select from the different translations output from them. As an example, given a source document 12 which includes three source sentences S1, S2, S3 in the source language, the SMT component 12 generates a corresponding number of target sentences, T1, T2, T3 of a target message 22 in the target language. A pair of source and corresponding target documents is referred to herein as a document pair or a bi-message. A pair of source and corresponding target sentences is referred to herein as a sentence pair or a bi-sentence.

For each sentence pair (pair of source and target sentences) (S1, T1), (S2, T2), (S3, T3) translated by the SMT component 20 features are extracted by a feature extraction component 26. The feature extraction component 26 may include a first feature extractor (FE1) 28 (a black box feature extractor, which does not rely on access to the SMT component 20), which extracts a first set of features from each sentence pair, e.g., by counting punctuation, words, and the like. A second feature extractor (FE2) 30 (a glass box feature extractor), extracts, for each sentence pair, scores that are internal to the SMT system 20. These scores typically reflect the inner working of the SMT system, e.g., number of translation hypothesis explored, as well as scores of each of the various models that are part of the SMT system (e.g., language model, reordering model, translation model). A second set of features is extracted based on each of these internal scores. If sufficient training data is available, an evaluation of features could be performed to identify an optimal feature set, although this is generally not needed.

A document-level representation generating component 34 generates a fixed-length, document-level representation 36 (bi-message representation) of the extracted features for the document pair 12, 22, based on the features for the constituent sentence pairs extracted by the feature extraction component 26. In an illustrative embodiment, the component 34 generates a Fisher vector (FV) or Fisher kernel (FK), based on the extracted features using a generative model 38, such as a Gaussian Mixture Model (GMM). In another embodiment, the document-level representation is an aggregate of the sentence-level representations, e.g., a geometric average (each feature being separately averaged). This avoids the need for a generative model 38, but may not perform as well. The exemplary component 34 generates only a single document-level representation 36 of a fixed dimensionality for a given document pair, irrespective of the number of sentence pairs it contains.

A prediction component 40 generates a document-level translation quality estimate (DQE) 42 for the entire translated document, based on the bi-message representation 36. In one embodiment, the prediction component includes a classifier which predicts the DQE based on the bi-message representation 36. The DQE 42 can be used by a decision component 44 to evaluate whether the translation is adequate for the task, e.g., whether DQE 42 meets a predefined threshold, and output a decision 46 based thereon, such as that the translation is satisfactory or that a new translation (machine or human) should be requested.

A training component 48 learns the parameters of the classifier 40, and may also learn the parameters of the mixture model 38. For the training phase (discussed below with reference to FIG. 2), a set 50 of training document translation pairs 52, 54, 56, 58, etc. is provided, each pair including a source message in the source language and a corresponding translation in the target language (or a bi-message representation 36 thereof). The training documents may be stored in memory 14 or in remote memory communicatively connected with the system. Each source and target message includes a number of sentences in the source language, the number being variable. At least some of the training document translation pairs 52, 54, have been manually annotated with a respective document-level manual translation quality estimate (MQE1, MQE2, etc.) 60, 62, etc. In the exemplary embodiment, no sentence-level manual quality estimate is needed. Each manually assigned MQE thus estimates the translation quality of the document pair as a whole, as for the predicted DQEs. Parameters of the mixture model 38 may have been optimized using the training set 50 or a separate set of document pair representations.

In one embodiment, in the training phase, the training component 48 learns parameters of the mixture model 38 on some of the training samples and uses the learned mixture model to compute bi-message representations 36, such as Fisher vectors, for at least some of the training samples. The classifier 40 can then be trained using the computed Fisher vectors and the respective MQEs. For example, the training component 48 learns parameters of a classifier model, such as a linear classifier, based on the MQEs and the respective bi-message representations 36 of the manually-labeled training samples.

As used herein a "document" can be any body of text which includes a plurality of sentences in a natural language with a grammar and a vocabulary, such as English or French. In general, the input document 12 is fairly short, such as up to a paragraph or two in length, e.g., on average, about 2-20 or 2-10 sentences in length, such as a message being sent between a customer and an agent or vice versa. For larger documents, the document may be split into sub-parts, e.g., paragraphs, and analyzed first at the paragraph level and then an overall document DQE computed based thereon. The training documents may be similar in length to that expected for the input documents.

Components 20, 26, 34, 40, 44, and 48 may be software components forming the set of instructions 16 for performing the method described below, which are stored in memory 14 of the system. As will be appreciated, the training component 48 may be omitted once the parameters of the mixture model 38 and classifier 40 have been learned. In some embodiments, these parameters may be learned on a separate computing device and input to the system 10.

The system 10 may be embodied in one or more computing devices, such as the illustrated server computer 70. One or more input/output (I/O) interfaces 72, 74 allow the system to communicate with external devices. Hardware components 14, 18, 72, 74 of the system communicate via a data/control bus 76. The source document 12 to be evaluated may be received from an external computing device 78 via a wired or wireless network 80, such as a local area network or a wide area network, such as the Internet. In some embodiments, part of the software 16 may be resident on the computing device 78.

Each computer 70, 78 may be a PC, such as a desktop, a laptop, palmtop computer, portable digital assistant (PDA), server computer, cellular telephone, tablet computer, pager, combination thereof, or other computing device(s) capable of executing instructions for performing the exemplary method. Computer 78 may be configured as for computer 70, except as noted.

The memory 14 may include any type of non-transitory computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 18 and memory 14 may be combined in a single chip. The network interface 72, 74 allows the computer to communicate with other devices via a computer network, such as a local area network (LAN) or wide area network (WAN), such as the Internet, and may comprise a modulator/demodulator (MODEM) a router, a cable, and and/or Ethernet port.

The digital processor 18 can be variously embodied, such as by a single-core processor, a dual-core processor (or more generally by a multiple-core processor), a digital processor and cooperating math coprocessor, a digital controller, or the like. The digital processor 18, in addition to controlling the operation of the computer 70, executes the instructions 16 stored in memory 14 for performing the method outlined in one or more of FIGS. 2 and 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
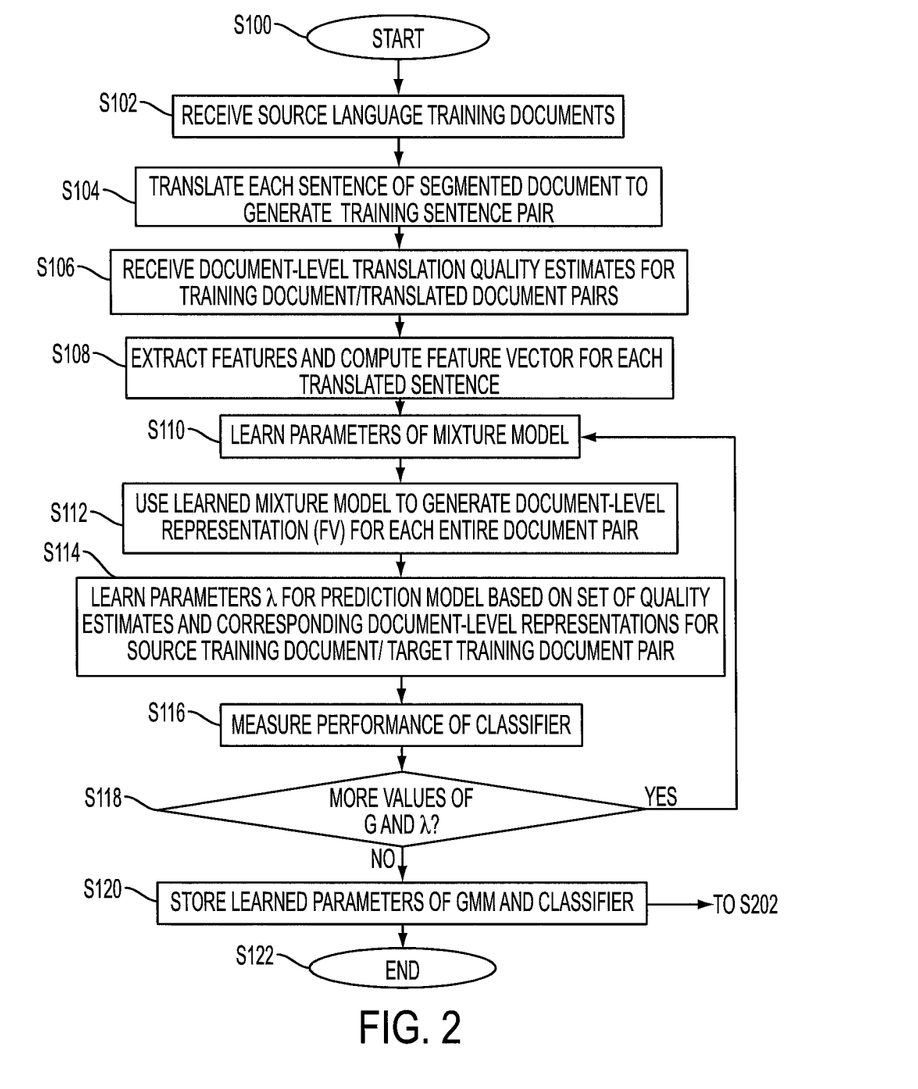
FIG. 2 is a flow chart illustrating a translation quality estimation method in accordance with one aspect of the exemplary embodiment.

FIG. 2 illustrates one embodiment of a method for generating a translation quality prediction system as illustrated in FIG. 1. The method begins at S100.

At S102, a training corpus 50 of M source language messages etc., is received, e.g., M is at least 50 or at least 100. The messages in the corpus 50 are representative of the type of text to be translated. Each message includes a respective set of sentences. The training documents can have different numbers of sentences, which may be representative of the documents for which the DQE is to be predicted, e.g., 3-10 sentences, on average.

At S104, the training messages 50 are each translated with the SMT component 20, to generate translated training messages. In particular, the message is automatically split into sentences and each sentence is translated independently. Any suitable machine translation component 20 may be used. In one embodiment, sentence translation is performed using biphrases drawn from a phrase table 78. In another, partial parse trees may be used. A target training document in the target language is created for each source training document, based on the translated sentences. More than one target translation may be generated.

At S106 manual annotations at the message level are received for at least a portion of the translated training messages, indicating the translation quality of the messages on some pre-defined scale. In one embodiment, the manual annotations are on an integer scale of 1-K, where K may be, for example, 4 or 5, although fewer scores or a continuous scale may be employed. In some embodiments, the annotations are simply binary. In the exemplary embodiment, the quality of translation of N of the messages is annotated by a human annotator (N is typically significantly smaller than M). This dataset may be split into a training set and validation set. Each bi-message may receive one or more human annotations and if more than one, the annotations may be averaged to generate the message-level translation quality estimate for the translation pair. One or several human annotators annotate the quality of translation of each pair of source/target training documents, e.g., with an integer score from 1-K. The annotators may be people who are bilingual in the source and target languages, and may also be knowledgeable on the topic covered by the documents. The annotations 60, 62, etc. are received by the training component 48 and may be stored in memory 14. In one embodiment, each training document pair 52, 54, 56, 58, etc. is assigned a single (only one) translation quality score MQE, based on the scores assigned by the annotators. In other embodiments, the manual quality estimates are in two or more dimensions, such as fluency and adequacy. These may be combined to generate a single value or a separate classifier may be learned for each dimension.

At S108, features are extracted for each sentence pair of at least a portion (or all) of the training documents (annotated or not), such as the black box and glass box features noted above. In the exemplary embodiment, a D-dimensional feature vector is generated by the feature extraction component 26 for each bi-sentence of the translation document pair based on the extracted features. A Principal Component Analysis (PCA) transformation on the set of features in the feature space may be used to reduce dimensionality.

At S110, parameters of a mixture model 38, such as a Gaussian mixture model (GMM), are learned using the feature vectors of at least some of the training messages. In one embodiment, a Gaussian Mixture Model with G components is fit to the set of D-dimensional feature vectors of all the sentence pairs of the training corpus. There are several methods for this. See, e.g., the Wikipedia entry at http://en.wikipedia.org/wiki/Mixture_model. This leads to a fixed number of parameters, which are function of G and D (mixture weights mean, and covariance matrix for each Gaussian). Forcing diagonal covariance matrices is computationally advantageous and does not reduce the generality of the approach. In this way, a generative model 38 is created for the feature vectors of the training sentences. In other embodiments, a previously learned generative model may be employed.

At S112, using the learned GMM 38, a document level representation, such as a Fisher Vector (FV), is computed by the representation generator 34 for each the annotated training documents, i.e., a document level representation. Each FV is computed as the gradient of the log-likelihood of the set of its sentences, with respect to the free parameters of the mixture model. The Fisher Vector generally indicates the direction into which the parameters of the generative model 38 should be modified to best fit the feature vectors of the sentences of the message. The number of dimensions of each of the FVs is constant, e.g., equal to the number of free parameters of the mixture model, and independent of the number of sentences of the messages.

At S114, a prediction model for a statistical classifier (e.g., learned by a support vector machine (SVM), or logistic regression method), parameterized, for example by $\lambda$, is trained using the message-level annotations and the FV of each message in the training set. For an SVM, or Logistic Regression, the parameters $\lambda$ learned include the penalty weight which is used to avoid overfitting. The trained classifier 40 is capable of receiving a document-level representation (e.g., an FV) for a new document and its translation and outputting a DQE score for the translated document.

At S116, the performance of the classifier is measured on a validation set. The validation set may be a set of manually annotated document translation pairs not used for learning the classifier, e.g., using an n-fold validation method.

At S118, the parameters of the classifier may be optimized by repeating steps S110-S116 for several different values of G and λ, so as to select the best combination. This can be achieved using a loop in G and an inner loop in λ, of which step S110 is not part. As will be appreciated, where a large number of Gaussians is used, there is a tendency towards overfitting. The method can thus seek to find a value of G just before performance starts to degrade. Performance of the classifier may be determined by comparing the classifier output DQE scores with the manual annotations.

Once G and λ have been chosen to yield the best performance measure on the validation set, the classifier can be trained again on the N messages. In this way, a binary (e.g., two outcomes, "satisfactory" and "not satisfactory"), ordinal (more than two discrete outcomes, such as integer values on a scale of, e.g., 1-4), or continuous scale classifier that operates at the message-level and which is trained from message-level human annotations is obtained.

At S120, the parameters of the GMM 38 and classifier 40 are stored in computer memory, such as memory 14.

The method ends at S122.

Figure 3:
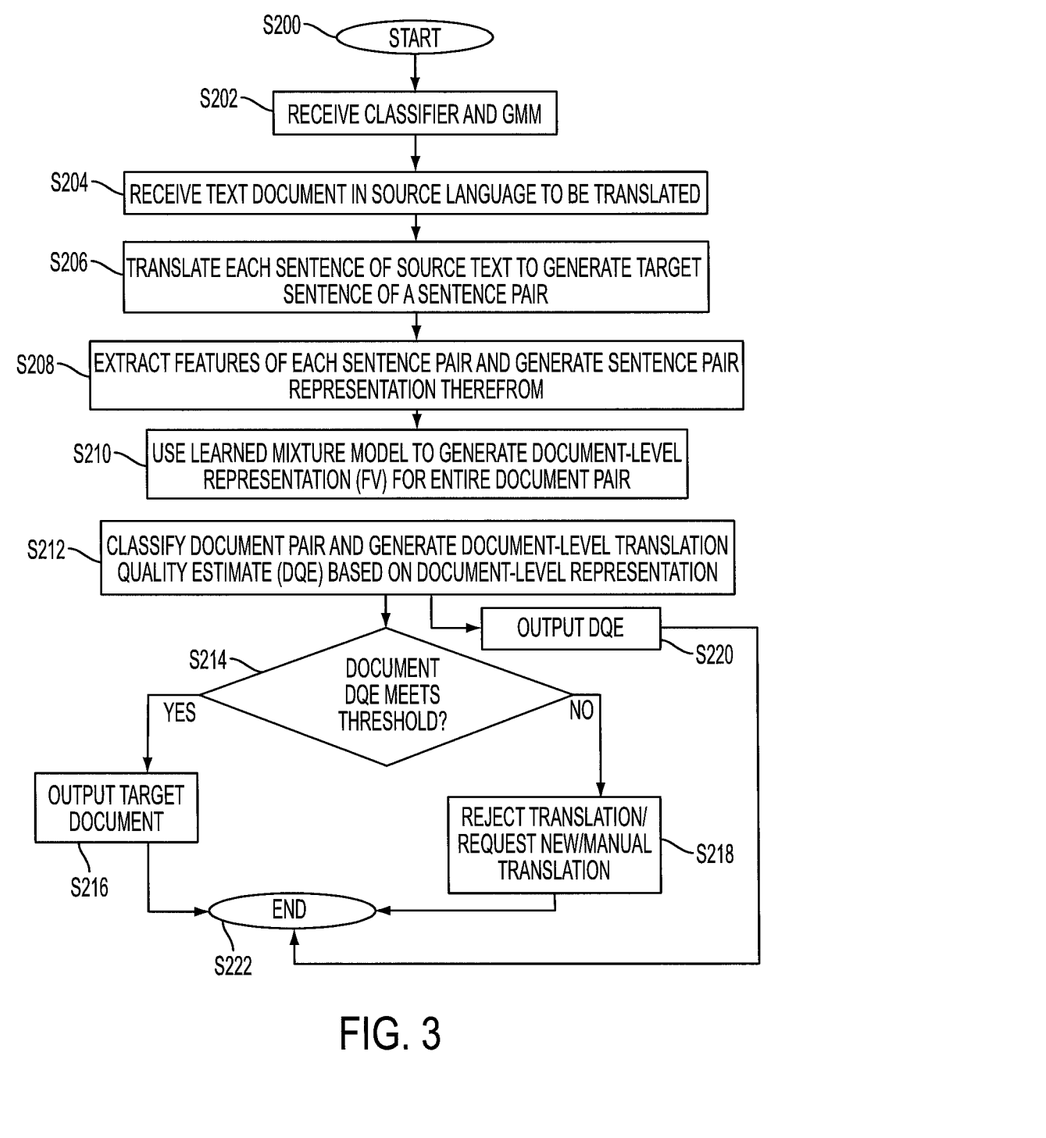
FIG. 3 is a flow chart illustrating learning an aggregating function for use in the quality estimation method of FIG. 2.

With reference now to FIG. 3, a method for using the trained GMM 38 and classifier 40 is shown.

The method begins at S200.

At S202, the learned GMM 38 and classifier 40 are retrieved.

At S204, a new message 12 in the source language is received. The input source-language document 12 may be received from any suitable source 78, such as a client computing device that is linked to the system 10 by a wired or wireless link 80, such as a local area network or a wide area network, such as the Internet. In other embodiments, I/O 72 is configured to receive a memory storage device, such as a disk or flash memory, on which the text is stored. In yet other embodiments, the system is wholly or partially hosted by the client device 78.

At S206, the source message is translated with the SMT component 20 into the target language, different from the source language. The machine translation is generated as for the training corpus messages, i.e., by segmenting the input source document 12 into sentences and separately translating each of the sentences of the document 12. In this step, a respective target language sentence is generated for each source sentence, or sometimes more than one target sentence is generated. In the exemplary machine translation process, each of a set of candidate translated sentences is scored with a translation scoring function and for each source sentence of the input document, an optimal translation (target sentence) is output, in the target language, based on the scores output by the translation scoring function for the candidate translated sentences. In some embodiments, a plurality of candidate target (multi-sentence) documents may be generated in this way using different combinations of high-scoring target sentences. Alternatively, different SMT components may be used to generate a respective translation of the input document.

At S208, features are extracted, based on the sentences of the input message and their respective translations, and a feature vector is generated for each sentence of the message, based on the extracted features, as for S108.

At S210, a Fisher vector is generated for the entire message, based on the gradient of the log-likelihood of the set of its sentence feature vectors with respect to the learned GMM, as for S112.

At S212, the Fisher vector is classified with the trained classifier 40, which outputs a classifier score (DQE) 42 based thereon.

At S214, a decision is made, based on the classifier score, as to whether the translation of the message is of at least a threshold quality. The decision component 44 determines whether the DQE 42 computed at S210 meets a preselected threshold DQE and, if so, information is output based thereon.

If the message DQE is of at least the threshold quality, the translated document may automatically be used as a translation of the input source document 12 (S216). For example, if the threshold DQE is met, then at S216 the target document 22 may be output, e.g., to the client device 78. Otherwise, at S218, the decision component may reject the translation and may output a request for a new translation. The new translation may be a manual translation and may be sought automatically, or proposed to a user. Alternatively, where a set of translations is available, e.g., from different machine translation systems 20, a different translation (which meets the threshold) may be selected for output. Or, in another embodiment, the system 10 may propose that the author of the source document reformulates the document, e.g., by using shorter sentences, more common words, and then having the document retranslated. An authoring system suited to this purpose is disclosed, for example, in U.S. Pub. No. 20140207439, published Jul. 24, 2014, entitled MACHINE TRANSLATION-DRIVEN AUTHORING SYSTEM AND METHOD, by Sriram Venkatapathy, et al., the disclosure of which is incorporated herein by reference in its entirety. In other embodiments, at S220, the decision 46 and/or DQE 42 may be output, e.g., to client computer 78, allowing an agent to decide whether the translation should be used or not.

The method ends at S222.

As will be appreciated, a separate computing device may be used for learning the parameters of the GMM and classifier to that used for translation of a new message. While in the exemplary embodiment, the trained classifier 40 is used at the message level, it may also be used at the sentence-level, e.g., by treating each sentence of a message as a separate message.

Fisher Vectors

The FV encoding aggregates sets of features extracted for each of the sentences of a translated message into a high-dimensional vector representation. In general, this is done by fitting a parametric generative model, e.g., a Gaussian Mixture Model (GMM), to the feature vectors extracted from the training sentence pairs, and then encoding the derivatives of the log-likelihood of the model with respect to its parameters. This may be performed as described, for example, in Jorge Sánchez, Florent Perronnin, Thomas Mensink, and Jakob Verbeek, "Image Classification with the Fisher Vector: Theory and Practice," INRIA Research Report No. 8209 (May 2013), "Sánchez, et al.," adapted as described below. While in the method of Sánchez, et al., the input representation is a set of patch representations of an image, in the present method, a set of sentence representations is the input, which representations are jointly used to generate a single Fisher Vector.

The GMM 38 can be considered as a general vocabulary which is characteristic of feature vectors of bi-messages in general (corresponding to the training set). A suitable general vocabulary can be estimated by clustering the feature vectors of a large number of training messages into a number of groups corresponding to the number of Gaussian functions (Gaussians) to be included in the general vocabulary. Assuming that the message feature vectors may be modeled according to a probability density function, denoted p( ) clustering may be performed by maximizing the likelihood function $p(X|\lambda_g)$ with respect to the parameters $\lambda_g$ of the general vocabulary, where X is the set of feature vectors $x_t$ output by the feature extraction component 26, and t runs from 1 . . . T where T is the number of feature vectors extracted from the set of training messages 50. Then, assuming that the feature vectors $x_t$ are independent, the likelihood function may be defined as:

$$p(X|\lambda_g) = \Pi_{t=1}^{N} p(x_t|\lambda_g) \qquad (1),$$

where N is the number of sentences in a given message.

In some embodiments, the general vocabulary $\lambda_g$ is a Gaussian mixture model given by:

$$p(x_t|\lambda_g) = \Sigma_{i=1}^{M} w_{i,g} p_{i,g}(x_t) \qquad (2),$$

where M is the number of mixture components, the subscript g denotes the general vocabulary, and the $w_{i,g}$'s are the mixture weights and are subject to the constraint: $w_{i,g} \geq 0$ for all i and $\Sigma_{i=1}^{M} w_{i,g} = 1$, and where each Gaussian component density $p_{i,g}$ is a D-variate Gaussian function of the form:

$$p_{i,g}(x_t) = \frac{1}{(2\pi)^{D/2} |\Sigma_{i,g}|^{1/2}} \exp\left\{-\frac{1}{2}(x_t - \mu_{i,g})^T \sum_i^{-1}(x_t - \mu_{i,g})\right\}, \qquad (3)$$

where: D is the dimension of the sentence-level feature vectors $x_t$; $\mu_{i,g}$ is the D-dimensional mean vector of the i-th Gaussian of the general vocabulary; $\Sigma_{i,g}$ is the covariance matrix (of size D×D) of the i-th Gaussian of the general vocabulary; |.| is the determinant operator; and T is the transposition operator. The parameters of the Gaussian mixture model are then $\lambda_g = \{w_{ig}, \mu_{ig}, \Sigma_{ig}\}$, where the subscript i indexes the Gaussians and the subscript g denotes the general vocabulary. In one embodiment, the dimension of the sentence-level features are reduced, for example, by applying a PCA projection.

The parameters $\lambda_g = \{w_{ig}, \mu_{ig}, \Sigma_{ig}\}$ of the example Gaussian mixture model general vocabulary may, in some embodiments, be iteratively estimated using Expectation-Maximization (EM) to optimize a Maximum Likelihood (ML) criterion on the training set (using both annotated and non-annotated training documents). For a discussion of EM, see Appendix B of Sánchez, et al., and Dempster, Laird, and Rubin, "Maximum Likelihood From Incomplete Data Via The EM Algorithm," Journal of the Royal Statistical Society, vol. 39(1), pp. 1-38 (1977).

While a Gaussian mixture model has been described for representing the general vocabulary, it is to be appreciated that other generative models can be employed.

In the exemplary embodiment a GMM 38 with diagonal covariances is trained, and only the derivatives with respect to the Gaussian mean and variances are considered. This leads to a representation which captures the average first and (optionally second) order differences between the (dense) feature vectors and each of the GMM centers, as represented by their means $\mu_{ig}$.

A Fisher Vector FV is then obtained by stacking the differences to form a vector. The FV encoding describes how the distribution of features of a particular message differs from the distribution fitted to the features of all training messages.

Where a large number of features are extracted for each sentence, they may first be decorrelated using, for example, Principal Component Analysis (PCA). For example the dimensionality can be reduced to about 64. The FV dimensionality is 2KD+K, where K is the number of Gaussians in the GMM, and D is the dimensionality of the sentence feature vector, or the dimension of the projection of the sentence feature vector is projected using PCA The performance of the FV can be further improved by passing it through signed square-rooting and $L_2$ normalization, as described, for example in F. Perronnin, J. Sánchez, and T. Mensink, "Improving the Fisher kernel for large-scale image classification," in ECCV (2010).

See, also, Perronnin, F., & Dance, C., "Fisher kernels on visual vocabularies for image categorization," IEEE Conference on Computer Vision and Pattern Recognition (CVPR'07), pp. 1-8 (2007), and Jaakkola, T., & Haussler, D., "Exploiting generative models in discriminative classifiers," Advances in Neural Information Processing Systems (NIPS), pp. 487-493 (1999).

In one embodiment, a bi-message is represented as a sequence $(x_t)_{t=1}^{T}$, where T is the number of bi-sentences in the bi-message and each bi-sentence is represented by a descriptor vector $x_t$ of fixed dimension D. The GMM model learnt on all the bi-sentences of all the bi-messages is characterized by the number K of mixture components and, for each component k=1 . . . K, the mean vector $\mu_k$ and diagonal vector $\sigma_k^2$ of the covariance matrix (assumed diagonal) of component k, as well as its weight $w_k$. Both $\mu_k$ and $\sigma_k^2$ are vectors of dimension D. The base Fisher Vector has one component for each weight $w_k$, and for each component of each vector $\mu_k$ and $\sigma_k^2$, hence 2KD+K components, given by:

$$G_{w_k} = \frac{1}{\sqrt{w_k}} \sum_{t=1}^{T} (\gamma_t(k) - w_k)$$

$$G_{\mu_{k,i}} = \frac{1}{\sqrt{w_k}} \sum_{t=1}^{T} \gamma_t(k) \left(\frac{x_{t,i} - \mu_{k,i}}{\sigma_{k,i}}\right)$$

$$G_{\sigma_{k,i}} = \frac{1}{\sqrt{w_k}} \sum_{t=1}^{T} \gamma_t(k) \frac{1}{\sqrt{2}} \left[\left(\frac{x_{t,i} - \mu_{k,i}}{\sigma_{k,i}}\right)^2 - 1\right]$$

where:

$$\gamma_t(k) = \frac{w_k u_k(x_t)}{\sum_{h=1}^{K} w_h u_h(x_t)}$$

$$u_k(x) = \prod_{i=1}^{D} \frac{1}{\sqrt{2\pi} \sigma_{k,i}} \exp -\frac{1}{2}\left(\frac{x_i - \mu_{k,i}}{\sigma_{k,i}}\right)^2$$

It is assumed that each weight $w_k$ is $\geq 0$ and that the weights for each of the K Gaussian components sum to 1, although this can be achieved with a soft-max formalism without explicitly enforcing these constraints. See Sánchez, et al. Further normalizations can be applied to the base Fisher Vector obtained by the above equations to generate the final representation of the document.

Optionally, one or more of the components may be omitted, such as $G_{w_k}$. This reduces the number of components to 2KD.

Classifier

Any suitable classifier 40 can be used for predicting the DQE.

Classifier learning can be performed with any suitable non-linear or linear learning method. Such classifier systems are well known and can be based, for example, on a variety of training algorithms, such as, for example: linear discriminants such as linear least squares, Fisher linear discriminant or Support Vector Machines (SVM); decision trees; K-nearest neighbors (KNN); neural networks, including multi-layer perceptrons (MLP) and radial basis function (RBF) networks; and probabilistic generative models based e.g., on mixtures (typically Gaussian mixtures). The exemplary classifier component 40 may include a multiclass classifier or a set of binary classifiers, each trained on a respective one of the possible labels (e.g., one for each of scores 1-4).

The measure of accuracy used to evaluate the classifier model is a function of the agreement between the model scores and the manual translation quality labels for the documents (e.g., after rounding one or both to the nearest integer value). For example, the "exact accuracy" may be the proportion (or percentage) of documents for which the classifier model correctly predicted the manual translation quality value of the document. Another accuracy measure which can be used is the "conservative accuracy." This measure is the proportion (or percentage) of documents for which the model predicted a value less or equal to the manual quality value of the document. This measure promotes an under-estimation of the document DQE value to avoid situations where a bad translation is predicted as being good.

Machine Translation

As the machine translation component 20, any suitable machine translation system can be used. An example machine translation system 20 includes a decoder which, given a source sentence, draws biphrases (source-target phrase pairs) from the phrase table 84 such that each word in the target sentence is covered by no more than one biphrase, thereby generating a candidate translation of the sentence or a part of the sentence from the target side of each of the biphrases used. The phrase table stores corpus statistics for a set of biphrases found in a parallel training corpus. Candidate translations generated in this way are scored with a translation scoring function to identify the most probable translation from a set of the candidate translations in the target natural language. The translation scoring function may be a log-linear function which sums a weighted set of features, some of which are derived from the corpus statistics for the biphrases retrieved from the phrase table, such as forward and reverse phrase and lexical translation probabilities. Other features may include language model, word penalty, and reordering features. See, for example, U.S. Pub. No. 20070150257, Christoph Tillmann and Fei Xia, "A Phrase-Based Unigram Model For Statistical Machine Translation," in Proc. HLT-NAACL 2003 Conf., Edmonton, Canada (2003), and Richard Zens and Hermann Ney, "Improvements in Phrase-Based Statistical Machine Translation," Proc. Conf. HLT-NAACL, pp. 257-264 (2004) for example scoring functions. An example machine translation system is a MOSES-based translation system.

Phrase based machine translation systems are disclosed, for example, in U.S. Pat. Nos. 6,182,026 and 8,543,563; U.S. Pub. Nos. 20040024581; 20040030551; 20060190241; 20070150257; 20070265825, 20080300857; 20110022380; 20110178791; 20110282643; 20110288852; 20110307245; 20120041753; 20120101804; 20120259807; 20120278060; 20130006954; 20140067361; and U.S. application Ser. No. 13/740,508, filed Jan. 14, 2013, entitled MULTI-DOMAIN MACHINE TRANSLATION MODEL ADAPTATION by Markos Mylonakis, et al. Language models, which can be used as a feature of the translation scoring function, are described, for example, in U.S. Pub. No. 20120278060. Methods for building libraries of parallel corpora from which phrase tables can be generated are disclosed, for example, in U.S. Pub. Nos. 20080262826 and 20100268527. The disclosures of all of these references are incorporated herein by reference in their entireties.

Extracted Features (S108, S208)

Some of the features extracted by the feature extraction component 26 may be MT system-dependent (glass box) features, provided that the system has access to the operation of the SMT component 20. Some of the features can be MT-independent (black box) features. A combination of glass box and black box features may be used. Examples of such features are described in Specia, et al. "Deliverable D2.1.2 Quality Estimation Software Extensions," pp. 1-31 (October 2013), available at http://www.qt21.eu/launchpad/system/files/deliverables/qtlp-deliverable-d2.1.2.pdf. Some or all of these features may be used in the present method, although additional or different features may also be employed.

Examples of glass box features, which are suited to use with a Moses statistical machine translation system, employ internal information from Moses, such as: n-best list with up to n translations for each source sentence, the phrase table (model) feature values for them (translation model scores, language model score, distortion scores, etc.), final model score, phrase and word-alignment, decoder word graph, and information from the decoder regarding the search space (number of nodes in search graph, number of nodes pruned, etc.). From these resources, various features can be extracted, such as one or more of: log probability score of the hypothesis (Moses' global score), which may be normalized by source sentence length; size of n-best list (number of hypotheses generated); for a LM built from the n-best list, the sentence n-gram log probabilities and perplexities (where n can be from 1-3), optionally normalized by sentence length; each of the translation and language model feature values (such as features based on forward and backward lexical probabilities, phrasal probabilities, distortion, and reordering); maximum size of the biphrases (number of words) used in the translation; proportion of unknown/untranslated words; average relative frequency of words in the translation across the n-best list (optionally score-weighted); average relative frequency of the words in the translation across the n-best list occurring in the same position as a respective target word; average size of hypotheses in the n-best list; n-best list density (vocabulary size/average sentence length); fertility of the words in the source sentence compared to the n-best list in terms of words (vocabulary size/source sentence length); edit distance of the current hypothesis to the center hypothesis (closest hypothesis to all others in the n-best list); total number of hypotheses in search graph; number/percentage of discarded/pruned/recombined search graph nodes; percentage of incorrectly translated possessive pronouns; percentage of incorrectly translated direct object personal pronouns.

Exemplary black-box features include those that rely on word counts, word-alignment information, part-of-speech (POS) tagging, features that represent linguistic phenomena that are only relevant for certain language pairs, and the like. Some or all of the following may be used: number of tokens in source (or target); ratio of number of tokens in source to target (or vice versa); absolute difference between number of tokens in source and target, which may be normalized by source length; average source token length; number of mismatched brackets (opening brackets without closing brackets, and vice versa); number of mismatched quotation marks (opening marks without closing marks, and vice versa); source sentence LM probability; source (or target) sentence LM perplexity; source (or target) sentence LM probability; number of occurrences of the target word within the target hypothesis (averaged for all words in the hypothesis—type/token ratio); average number of translations per source word in the sentence in the phrase table or with a given threshold probability in the source corpus, optionally weighted by the frequency (or inverse frequency) of each word in the source corpus; average unigram (or bigram or trigram) frequency in quartile 1 (or 2, 3, or 4) of frequency (lower frequency words) in the corpus of the source language; percentage of distinct source unigrams (or bigrams, or trigrams) seen in a corpus of the source language (in all quartiles); average word frequency that each word in the source sentence appears in the corpus (in all quartiles); absolute difference between number of periods (or commas, colons, semicolons, question marks, or exclamation marks), in source and target sentences, optionally normalized by target length; absolute difference between number of commas in source and target sentences, optionally normalized by target length; percentage of punctuation marks in source (or target) sentence; absolute difference between number of punctuation marks between source and target sentences normalized by target length; percentage of numbers in the source (or target) sentence; absolute difference between number of numbers in the source and target sentences, normalized by source sentence length; number of tokens in the source (or target) sentence that do not contain only a-z; ratio of number/percentage tokens containing only a-z in the source to that in the target sentence; percentage of content words in the source (or target) sentence; ratio of percentage of content words in the source and target; LM probability of POS tags of target sentence; LM perplexity of POS tags of target sentence; percentage of nouns (or verbs or pronouns) in the source (or target) sentence; ratio of percentage of nouns or (or verbs, or pronouns) in the source and target sentences; number of dependency relations with aligned constituents, normalized by the total number of dependencies (max between source and target sentences), optionally with the order of the constituents ignored; number of dependency relations with possibly aligned constituents (using Giza's lexical table with p>0.1) normalized by the total number of dependencies (max between source and target sentences); absolute difference between the depth of the syntactic trees of the source and target sentences; number of prepositional phrases (PP) (or noun phrases (NP), or verbal phrases (VP), or adjectival phrases (ADJP) or adverbial phrases (ADVP), or conjunctive phrases (CONJP)) in the source (or target) sentence; absolute difference between the number of PP (or NP, VP, ADJP, ADVP, or CONJP) phrases in the source and target sentences, optionally normalized by the total number of phrasal tags in the source sentence; geometric mean (lambda-smoothed) of 1-to-4-gram precision scores of target translation against a pseudo-reference produced by a second MT system; source probabilistic context-free grammar (PCFG) parse log-likelihood; source PCFG average confidence of all possible parses in n-best list; source PCFG confidence of best parse; count of possible source PCFG parses; target PCFG parse log-likelihood; target PCFG average confidence of all possible parses in n-best list of parse trees for the sentence; target PCFG confidence of best parse; count of possible target PCFG parses; Kullback-Leibler (or Jensen-Shannon) divergence of source and target topic distributions; divergence of source and target topic distributions; source sentence intra-lingual triggers; target sentence intra-lingual triggers; source-target sentence inter-lingual mutual information, percentage of incorrectly translated possessive pronouns (or direct object personal pronouns) (for Arabic-English only); Information retrieval (IR) features that measure the closeness of the test source sentences and their translations to parallel training data available to predict the difficulty of translating each sentence or finding their translations; IR score for each training instance retrieved for the source sentence or its translation; and combinations thereof.

An example method uses a limited set of features which have been found to be good predictors of machine translation quality, such as those used in the 2012 Workshop on Machine Translation (see, Callison-Burch, et al., "Findings of the 2012 workshop on statistical machine translation," Proc. Seventh Workshop on Statistical Machine Translation, Association for Computational Linguistics, Montreal, Canada, pp. 10-51 (2012), or a subset of these.

The method illustrated in one or more of FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in one or more of FIGS. 2 and 3, can be used to implement the method for predicting document translation quality. As will be appreciated, while the steps of the method may all be computer implemented, in some embodiments one or more of the steps may be at least partially performed manually.

Without intending to limit the scope of the exemplary embodiment, the following Examples describe a prototype system for performing the method shown in FIGS. 2 and 3.

The exemplary method allows prediction of machine translation quality at the message-level, without requiring training samples that are manually annotated at the sentence level and which is independent of the number of sentences in the message. This method relies on a probabilistic framework that can describe each message as a fixed-length length vector that aggregates sentence-level descriptors.

Without intending to limit the scope of the exemplary embodiment, the following Example demonstrates the applicability of the method.

EXAMPLE

Experiments were conducted based on human annotation produced by Swedish-English bilingual agents (including Agents denoted 1 and 2). The three agents annotated several datasets as shown in TABLE 1. The annotations were converted to binary values for convenience. Additionally 342 non-annotated Swedish messages were available.

TABLE 1

|  | Number of Swedish messages annotated | Agent 1 | Agent 2 |
|---|---|---|---|
| Train1 | 52 | ✓ | |
| Test1 | 70 | ✓ | |
| Test2 | 50 | | ✓ |
| Total No. of annotated messages | 172 | | |

The metric used to compare the methods is a precision/recall curve, summarized by one numerical value: the average precision (the area under the curve). The plot is obtained by varying the threshold used by the statistical classifier. For a Baseline comparison, the messages of Train1 were also annotated at sentence-level by Agent 1 (179 sentences). This allowed the method described in application Ser. No. 14/244,385 to be run and tested on Test1 and Test2 as the baseline. The method in application Ser. No. 14/244,385 computes a quality score for the translation of a whole message (a set of sentences, i.e., a document) based on the quality scores of the individual sentences composing this document. In order to combine the sentence-level estimates, a generalized mean whose parameters are trained over a small collection of document-level quality estimations is used. This baseline method, based on generalized means, requires additional annotation compared to the present method, since the training set is annotated both at sentence- and message-level.

Results

TABLE 2 shows the average precision for the present method (FV method), on Test1 (with Agent 1's annotation) and Test2 (with Agent 2's annotation) for Swedish to English, after training on Train1 (Agent 1's annotation). The Baseline method was only trained on Train1, since Agent1 annotated ~180 sentences.

TABLE 2

| Swedish to English | Test1 Agent 1's messages | Test2 Agent 2's messages |
|---|---|---|
| Baseline | 94% | 93% |
| FV method | 92% | 89% |

A small decrease of average precision was observed, as compared to the baseline method. This may not be significant as variations of a few percent were observed on the baseline (due to the random shuffling done when running the n-fold cross-validation).

Although the evaluation was performed on a relatively small dataset, the results suggest that the exemplary method is on par with the baseline, but requires less human annotation (only at message-level). Annotation at the document level can be easier to produce.

The exemplary method relies on the availability of a large set of sentences from which a generative model can be built, and the FVs (Fisher-vectors) then provide a re-parameterization of the sentences in a feature space which has the same dimensionality as the generative model used. This allows for solving the problem of handling elements modeled with different dimensions (variable number of sentences in documents).

In addition, additional annotations could be collected for retraining the system by allowing the recipient of the translated message to provide feedback on its language quality and understandability, which could be far more difficult to obtain at the sentence-level.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for predicting the translation quality of a translated input document comprising:
   receiving an input document in a source language;
   with a machine translation component, generating an input document pair composed of a plurality of sentence pairs, each sentence pair including a source sentence of the input document in a source language and a machine translation of the source language sentence to a target language sentence;
   for each of the sentence pairs, generating a representation of the sentence pair based on a set of features extracted for the sentence pair;
   generating a representation of the input document pair based on the sentence pair representations;
   predicting a translation quality of the translated input document based on the representation of the input document pair; and
   comparing the predicted translation quality for the input document pair with a threshold to determine whether the translation quality for the translated document meets the threshold, wherein when the translation quality meets the threshold, outputting the translation of the document to an external device,
   wherein the generating of the representation of the sentence pair, the generating of the representation of the input document pair, and the predicting of the translation quality of the translated input document are performed with a processor.

2. The method of claim 1, wherein the method further comprises translating an input document to generate the input document pair.

3. The method of claim 1, wherein the features for each sentence pair comprise a first set of features which are extracted from the source sentence and target sentence themselves a second set of features based on scores that are internal to an SMT system used to generate the translation of the source sentence.

4. A method for predicting the translation quality of a translated input document comprising:

receiving an input document pair composed of a plurality of sentence pairs, each sentence pair including a source sentence in a source language and a machine translation of the source language sentence to a target language sentence;

for each of the sentence pairs, generating a representation of the sentence pair based on a set of features extracted for the sentence pair;

generating a fixed length representation of the input document pair, based on the sentence pair representations, using a Gaussian Mixture Model;

predicting a translation quality of the translated input document based on the representation of the input document pair; and outputting a decision to an external device based on the predicted translation quality of the translated input document, wherein the generating of the representation of the sentence pair, the generating of the representation of the input document pair, and the predicting of the translation quality of the translated input document, and the outputting of the decision are performed with a processor.

5. The method of claim 1, wherein the generating of the representation of the sentence pair based on a set of features extracted for the sentence pair is performed using a generative model.

6. The method of claim 5, wherein the generative model comprises a Gaussian Mixture Model.

7. The method of claim 6, wherein the representation of the input document pair includes a component for each of a set of weights, one weight $w_k$ for each of a plurality of Gaussian functions k in the Gaussian mixture model and one component for each of the respective mean vector $\mu_k$ and diagonal vector $\sigma_k^2$ of a covariance matrix of each of the Gaussian functions.

8. The method of claim 1, further comprising learning the generative model from a training set, the training set comprising document pairs that are annotated with a translation quality estimate.

9. The method of claim 8, wherein each of the annotated training document pairs is annotated with a respective translation quality estimate selected from a finite set of from 2-10 translation quality estimates.

10. The method of claim 1, wherein the predicting of the translation quality of the translated input document is performed with a classifier trained on representations of annotated training document pairs each of the annotated training document pairs being composed of a plurality of sentence pairs, each sentence pair including a source sentence in the source language and a machine translation of the source language sentence to a target language sentence, each representation of an annotated training document pair being based on a set of features extracted for the annotated training document pair.

11. A computer program product comprising a non-transitory recording medium storing instructions, which when executed on a computer causes the computer to perform the method of claim 1.

12. A system for predicting the translation quality of a document comprising memory which stores instructions for performing the method of claim 1 and a processor in communication with the memory which executes the instructions.

13. The method of claim 1, wherein the generating of the input document pair comprises retrieving biphrases from a phrase table to generate candidate translations of the input document sentences and scoring the candidate translations with a translation scoring function to identify the most probable translation from a set of the candidate translations, the translation scoring function being a log-linear function which sums a weighted set of features, some of the features being derived from corpus statistics for the biphrases retrieved from the phrase table.

14. The method of claim 4, further comprising comparing the predicted translation quality for the input document pair with a threshold to determine whether the translation quality for the translated document meets the threshold.

15. The method of claim 4, wherein the generating of the fixed length representation of the input document pair comprises generating a Fisher vector, based on the gradient of the log-likelihood of the sentence pair representations with respect to the Gaussian Mixture Model.

16. A system for predicting the translation quality of a translated input document comprising:

memory which stores:

a machine translation component for translating sentences of an input document from a source language to a target language to provide a translated input document comprising a plurality of sentence pairs, the translation of the sentences being performed using biphrases drawn from a phrase table or partial parse trees;

a feature extraction component which generates a representation of each of the sentence pairs, based on a set of features extracted for the sentence pair;

a document-level representation component which uses a generative model to generate a fixed-length representation of the input document, based on the sentence pair representations;

a prediction component for predicting a translation quality of the translated input document based on the representation of the input document; and a decision component for outputting a decision based on the predicted translation quality of the translated input document; and a processor which implements the machine translation component, feature extraction component, document level representation component, and prediction component, and decision component.

17. The system of claim 16, further comprising a decision component for outputting a decision based on the predicted translation quality of the translated input document.

18. The system of claim 16, further comprising a training component for learning parameters of the generative model.

19. The system of claim 16, wherein the prediction component comprises a classifier model trained on document representations of annotated training document pairs and a respective annotation of translation quality for each training document pair.

20. A method for generating a system for predicting the translation quality of a document comprising:

receiving a set of training document pairs, each training document pair including a plurality of training sentence pairs, each of the training sentence pairs comprising a source sentence in a source language and a target sentence in a target language, the target sentence being a machine translation of the respective source sentence, at least some of the training document pairs being annotated with a translation quality estimate;

providing a feature extraction component which generates a representation of each of the training sentence pairs, based on a set of features extracted for the sentence pair;

generating a generative model, based on the representations of the training sentence pairs, for generating a fixed-length, document-level representation for a new document pair based on representations of a plurality of sentence pairs of the new document pair; and training a prediction component to predict a translation quality of the new document pair, the training being based on the translation quality estimates and document-level representations of the training sentence pairs generated with the generative model, storing the generated system including the feature extraction component, generative model, and trained prediction component in computer memory, wherein at least one of the generating and training is performed with a processor.

21. A system for generating a system for predicting the translation quality of a document comprising memory which stores instructions for performing the method of claim 20 and a processor in communication with the memory which executes the instructions.

* * * * *